US008806800B2

(12) United States Patent
Hupp et al.

(10) Patent No.: US 8,806,800 B2
(45) Date of Patent: Aug. 19, 2014

(54) FISH RELEASE DEVICE FOR RETURNING OF FISH EXHIBITING BAROTRAUMA TO SUFFICIENT DEPTHS PRIOR TO RELEASE OF FISH SUCH THAT EFFECTS OF BAROTRAUMA ARE SUCCESSFULLY REVERSED AND FISH CAN SURVIVE

(71) Applicants: Randall D. Hupp, Spring Valley, CA (US); Timothy Gene Marshall, Spring Valley, CA (US)

(72) Inventors: Randall D. Hupp, Spring Valley, CA (US); Timothy Gene Marshall, Spring Valley, CA (US)

( * ) Notice: Subject to any disclaimer, the term of this patent is extended or adjusted under 35 U.S.C. 154(b) by 0 days.

(21) Appl. No.: 13/662,413

(22) Filed: Oct. 27, 2012

(65) Prior Publication Data
US 2013/0047487 A1 Feb. 28, 2013

Related U.S. Application Data

(63) Continuation of application No. 13/444,234, filed on Apr. 11, 2012.

(60) Provisional application No. 61/475,101, filed on Apr. 13, 2011.

(51) Int. Cl.
*A01K 97/00* (2006.01)
*A01K 97/18* (2006.01)
*A01K 97/14* (2006.01)

(52) U.S. Cl.
CPC ............... *A01K 97/14* (2013.01); *A01K 97/00* (2013.01)
USPC .................................................. 43/4; 43/53.5

(58) Field of Classification Search
CPC ....... A01K 97/18; A01K 97/00; A01K 97/14; A01K 83/06; A01K 91/04; A01K 97/24; A01K 97/28; B25B 7/02; B25B 5/068; B25B 5/163; B25B 5/06; B25B 5/166; B25B 5/101; B25B 7/00
USPC ........... 43/53.5, 4; 294/99.2, 118; 269/3, 6, 9, 269/95, 143, 249
See application file for complete search history.

(56) References Cited

U.S. PATENT DOCUMENTS

| 1,025,362 | A | * | 5/1912 | Beuoy | 606/210 |
| 1,879,161 | A | * | 9/1932 | Frambach et al. | 43/53.5 |
| 2,630,344 | A | * | 3/1953 | Wakefield | 294/118 |
| 2,653,048 | A | * | 9/1953 | Novak | 294/99.2 |
| 4,023,303 | A | * | 5/1977 | Maunu | 43/53.5 |
| 4,965,954 | A | * | 10/1990 | Cavazos | 43/4 |
| 2008/0110077 | A1 | * | 5/2008 | Callaway | 43/4.5 |

* cited by examiner

*Primary Examiner* — Darren W Ark
*Assistant Examiner* — Kathleen Alker
(74) *Attorney, Agent, or Firm* — Todd J. Langford; Eric A. Hanscom

(57) ABSTRACT

A fish release device is claimed, comprising a spring-loaded set of opposing members with tip portions capable of retaining the lip of a fish suffering from barotrauma to a depth sufficient to reverse the effects of barotrauma prior to releasing the fish. The opposing members cross over each other such that the jaws can be temporarily opened merely by tugging upward on the line attached to the device. Once the jaws are opened, the fish normally swims away rapidly, before the jaws close again. The device is small, compact, and can be used with a variety of fish species and sizes.

9 Claims, 7 Drawing Sheets

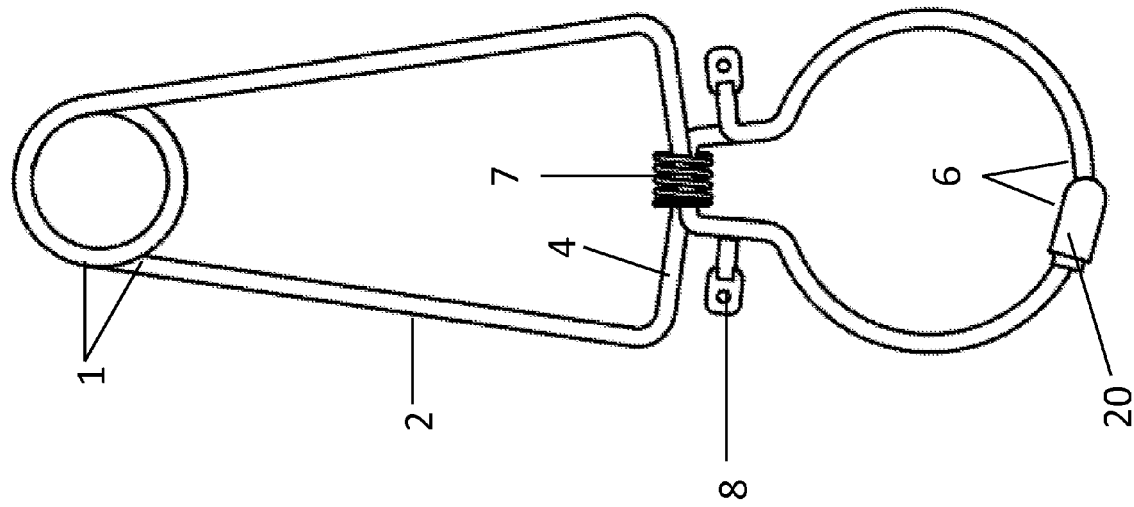
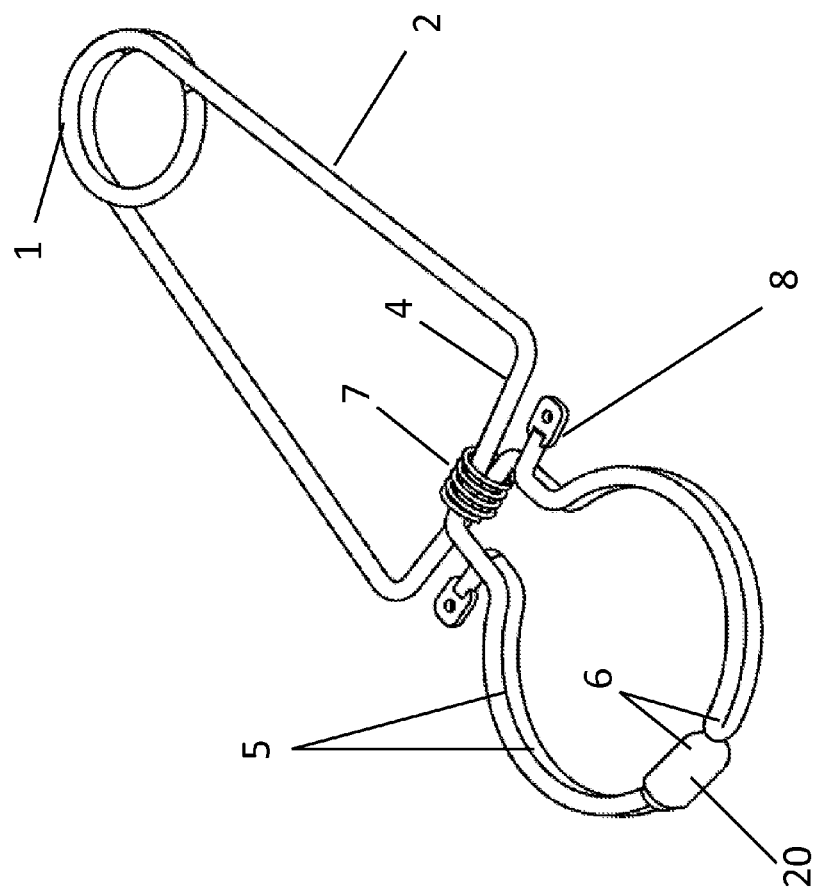
Figure 2

FISH RELEASE DEVICE FOR RETURNING OF FISH EXHIBITING BAROTRAUMA TO SUFFICIENT DEPTHS PRIOR TO RELEASE OF FISH SUCH THAT EFFECTS OF BAROTRAUMA ARE SUCCESSFULLY REVERSED AND FISH CAN SURVIVE

CROSS REFERENCE TO RELATED APPLICATIONS

This application is a continuation of U.S. patent application Ser. No. 13/444,234 filed on Apr. 11, 2012, which in turn claims priority to U.S. Provisional Pat. App. No. 61/475,101 filed on Apr. 13, 2011, the entireties of which are hereby incorporated by reference.

STATEMENT REGARDING FEDERALLY SPONSORED RESEARCH OR DEVELOPMENT

This invention was not federally sponsored.

BACKGROUND OF THE INVENTION

1. Field of the Invention

The invention lies in the general field of gear related to fishing, and more specifically, to gear designed to retain fish prior to their release at depths where the fish will survive its return to the ocean or lake.

2. Definition of the Problem Addressed by this Invention

Many species of fish caught by both recreational and commercial fishing operations are found at depths where barotrauma occurs when the fish is caught and brought to the surface. Barotrauma is defined as a "pressure shock" which occurs when certain species of fish—particularly rockfish—that contain a swim bladder, which is a gas-filled organ normally located behind the stomach of the fish, are caught and brought to the surface rapidly (as is normally the case when a fish is caught on a hook and line). As the fish rises vertically in the water column, the water pressure on the fish decreases rapidly as the fish is pulled up from deeper water to the surface. For example, a fish caught 100 feet down in a lake or ocean is living under approximately three atmospheres of pressure, and many commercially-fished species are caught in water several hundred feet deep. As the water pressure decreases, gases expand in the swim bladder, quickly making it swell. Since the swim bladder is inside the fish, as it expands it pushes against the stomach, often forcing the stomach outside of its mouth.

Not all the fish caught by both recreational and commercial fishing operations are "keepers", or, those fish which the fisherperson wishes to kill and use for food. If the fish suffering from barotrauma is then released, most commonly by throwing back into the ocean, it normally will not survive, as the fish has no mechanism to force the gas to escape from its swim bladder. A released fish suffering from barotrauma is often called a "floater", as it cannot swim down from the surface, and often lies sideways on the surface, unable to do more than flap its fins as it ineffectively tries to swim back down to its natural habitat. Natural predators such as seals, sea lions, and birds have grown accustomed to sport and commercial fishing boats leaving behind large numbers of floaters, so they tend to follow such boats and eat the fish as they lie on the surface.

Why are there so Many "Floaters"?

There are many species that are protected or have limits on the number or size of individuals that can be retained for human consumption. Some rockfish species, such as the Canary Rockfish and Yelloweye Rockfish, are protected in some areas by law from any sport or commercial taking However, since these rockfish are often found at depths exceeding 100 feet (indeed, the average depth for adult Yelloweye Rockfish is 300 to 590 feet), many of the individuals caught end up dying on the surface as "floaters" after they are released.

Other species have limits, such as the Bocaccio, which has a limit in California of two per fisherperson with a minimum size of 10 inches total length. The Bocaccio lives at an average depth of 250 to 750 feet, so most Bocaccio caught will have barotrauma when they are pulled to the surface. So, when a fisherperson pulls in a Bocaccio that is 9 inches long, that fish is thrown back, where it is very likely to perish on the surface. Indeed, if a particular fisherman catches 20 Bocaccio and all are less than 10 inches in length, it is a safe assumption that most if not all of the 20 will end up dead. Conversely, if a fisherman catches 2 Bocaccio "keepers" of, say, 15 inches each, and then catches 10 more Bocaccio all above 10 inches in length, it is a safe assumption that of the 12 Bocaccio caught, all will end up dead: two going home with the fisherman and 10 being killed as floaters.

The result of the ineffective methods of releasing fish with barotrauma is that an enormous number of protected and juvenile fish are killed every year outside of the legal "limits" on species, number and size of fish actually kept by the fisherpeople. It is estimated that the number of "floaters" which are killed as a byproduct of sport and commercial fishing operations sometimes equals or in some cases exceeds the number of "keepers". With this constant pressure on the number of fish, the average size of "keeper" fish has dropped noticeably over the past several decades. This has negatively impacted sport and commercial fishing industries, consumers of seafood, and, most importantly, the fish species themselves, as a substantial amount of their population is worthlessly killed every year.

Thus, a problem presents itself: How to decrease the number of "floaters"?

Prior Art and Other Attempts to Address this Problem.

It has been known for some time and if a fish suffering from barotrauma can be descended to a depth of 100 feet or deeper within 10 minutes of its emergence at the surface, it has a very good chance at surviving. Indeed, the California Department of Fish and Game states that "83% of fish caught at depths between 217 and 350 feet, survived when returned to depth within 2 minutes", and they site studies that show that many of the returned fish were still alive 1.5 years later.

There have been several approaches to getting a barotrauma victim back to a safe depth. A simple solution was to turn a weighted milk crate upside down over a floater, then lower the crate to a depth of 60 feet or more, whereupon the gas in the fish's swim bladder will recompress and the fish can swim away under its own power. While this method is theoretically possible, it does not work well in rough seas, requires considerable time and effort on the part of the fisherperson, and may damage the fish's eyes as they are scraped across the openings in the bottom and sides of the milk crate.

It is important to realize that unless there are laws passed that mandate the use of a fish release device such as this invention on recreational and commercial fishing boats, the proverbial "tragedy of the commons" will result in all too many cases. A commercial fisherman may not want to spend a large amount of time releasing non-keepers, as this will cut into the time he has to catch and prepare keepers for market. A recreational fishing boat may also not want to invest more time into releasing fish than in catching them, as is the case with a milk carton where a fisherman can haul up a fish in less than a minute but it can take between 5 and 10 minutes to lower the milk crate and haul it back to the surface. Thus, having a fish release device that works quickly and efficiently is very important to convince both recreational and commercial fishermen to invest in such a device and to use it.

A second approach was to take a weight with a barbless hook, hook the floater through its lower lip, then have the weight descend the fish to 100 feet or so of depth. When the pressure is enough to compress the gas in the swim bladder, the fish can theoretically wiggle around and dislodge the barbless hook. There are several potential problems with this approach. First, you have to put another hole in the fish's mouth to try to save it. Second, the fish can hook its extended stomach on the hook, whether it is barbless or not, causing further damage to the fish.

A third approach was the "Git-R-Down" fish release. This device has opposing jaws that can grasp a rockfish's lower lip, with the pressure applied by a large weight at the bottom of the device. When the device is lowered to the bottom, the weight is taken off the jaws; they open and release the fish. This device however requires a hard bottom to release the fish, which presents some problems. First, it has been proven that even for a fish caught several hundred feet below the surface of the ocean, if you can just get it back down to 100 feet of depth, which is usually sufficient to allow it to swim away under its own power. By requiring a fisherperson to get the barotrauma victim all the way back to the bottom (sometimes 500 feet or deeper), it will require a significant amount more time, which will decrease the likelihood that the fisherperson will use the device. Second, not all barotrauma victims are caught on the bottom and the angler may not have sufficient line on the reel to get the fish to the bottom. Third, the device is large and bulky, which both increases its cost and decreases the likelihood that an angler will bring it along on a fishing trip.

Thus there exists a need for a compact and efficient device that can descend a rockfish or other fish suffering from barotraumas back down to a water depth sufficient to allow the swim bladder to decompress to a size where the fish can swim away under its own power. The current invention provides just such a solution by providing an invention comprising a spring-loaded set of opposing members with tip portions capable of retaining the lip of a fish suffering from barotrauma to a depth sufficient to reverse the effects of barotrauma prior to releasing the fish. A preferred embodiment of the invention is a fish release device that has two opposing members that are combined by a coiled spring section, where each of the two opposing members has curved tip portions that can pinch together and grasp the lower lip of a barotrauma victim. The angler can attach a weight to the bottom of the device and then sink the device and the fish to a depth sufficient to reverse the effects of barotrauma prior to releasing the fish. The opposing members cross over each other such that the jaws can be temporarily opened merely by tugging upward on the line attached to the device. Once the jaws are opened, the fish normally swims away rapidly, before the jaws close again. The device is small, compact, and can be used with a variety of fish species and sizes. The current invention provides just such a solution by providing a fish release device It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

Indeed, it is specifically disclosed that alternative methods of achieving similar results can be found in which there is no spring at all; rather the compression between the jaws can be caused through the use of resilient wire, plastic and other compounds.

BRIEF DESCRIPTION OF THE FIGURES

FIG. 2 are two additional views of the invention showing its basic parts.

DETAILED DESCRIPTION OF THE FIGURES

Figure 1:
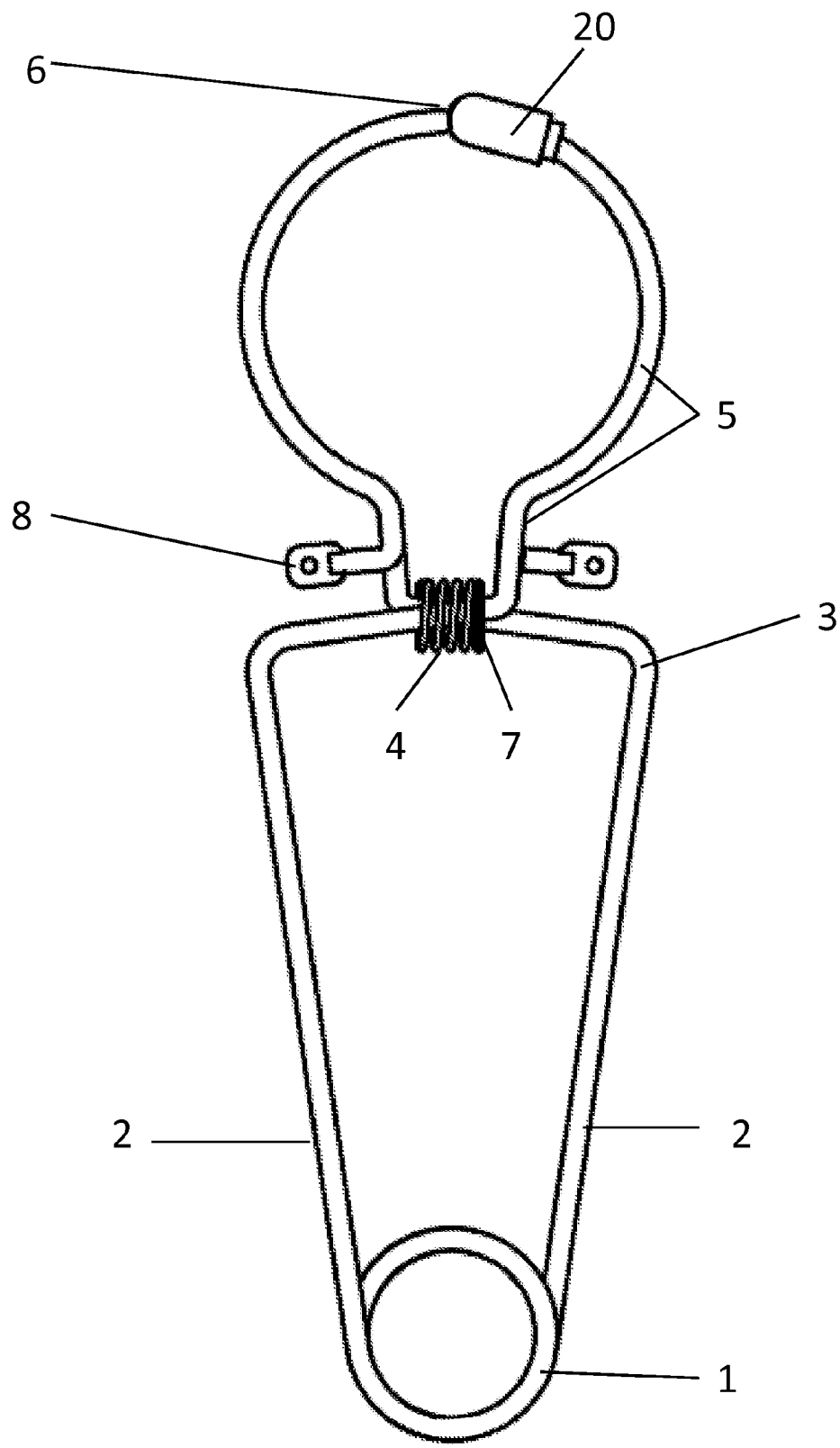
FIG. 1 is a top view of the invention showing its basic parts.

Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The invention is one embodiment is a single piece of wire bent in a variety of patterns, with a metal sleeve holding the two opposing portions of the wire together. FIG. 1 is a top view of the invention showing its basic parts. FIG. 2 are two additional views of the invention showing its basic parts.

Halfway in between the ends of the piece of wire, a spring (1) is created, with two opposing members (2) coming out of either end of the spring. The opposing members have a sharp bend (3) and then cross over each other at point (4). A sleeve (7) encircles both opposing members. Each opposing member is then bent approximately 90 degrees upward, and then into a two-layered semicircular "jaws" (5), ending in contact points (6) before returning back and terminating in a flattened attachment point (8). The spring (1) creates pressure pushing the two opposing members (2) apart. The two opposing members (2) are kept in alignment by the sleeve (7), such that their contact points (6) remain in contact. The means of contact in the embodiment is where one prong has a larger end with a concave hollow at its tip, and the other prong has a smaller, rounded end that fits within the concave hollow of the other prong. There is, optionally, a plastic cap (20), also referred to as a cap portion, that covers the smaller, rounded end to further protect the mouth of the fish from damage. Thus, by using finger pressure on the two opposing members, an angler can open the jaws, slip the points over the lower lip of a barotrauma victim, then release the finger pressure, allowing the spring to force the points together to grasp and retain the rockfish.

Figure 3:
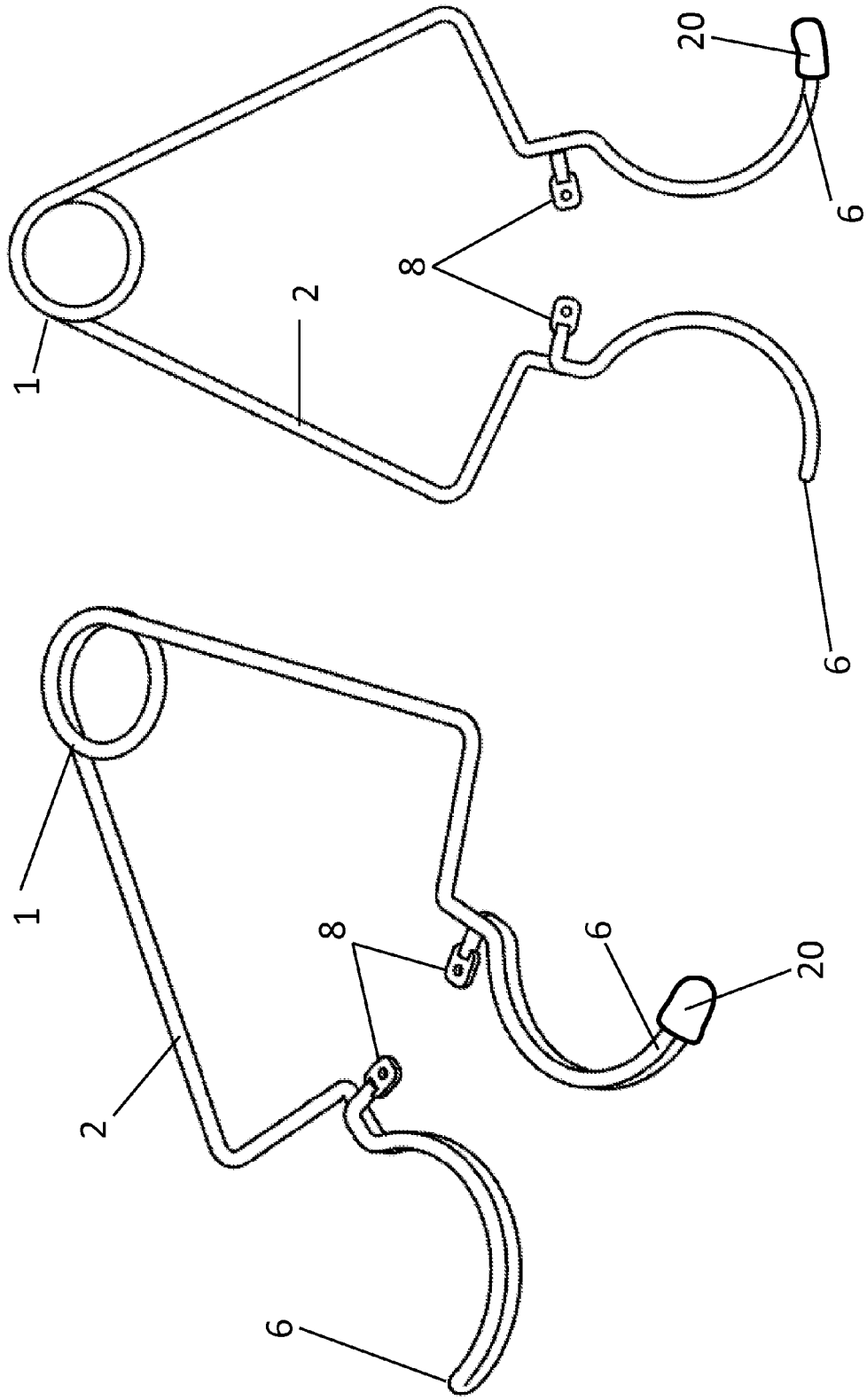
FIG. 3 are two additional views of the invention showing its basic parts before the two opposing members are crossed over to create the grasping jaws.

FIG. 3 shows the wire portion in an unconstrained position, before the two opposing members are crossed over each other and secured with the sleeve. From this picture, it can be appreciated that the number of coils, the strength of the wire, and the initial angle of the two opposing members can be varied to create a fish descending device of varying amounts of eventual force between the contact points (6). This figure also shows a particularly preferred embodiment of the invention in which a single strand of ⅛" thick Stainless 304 wire is used.

Figure 4:
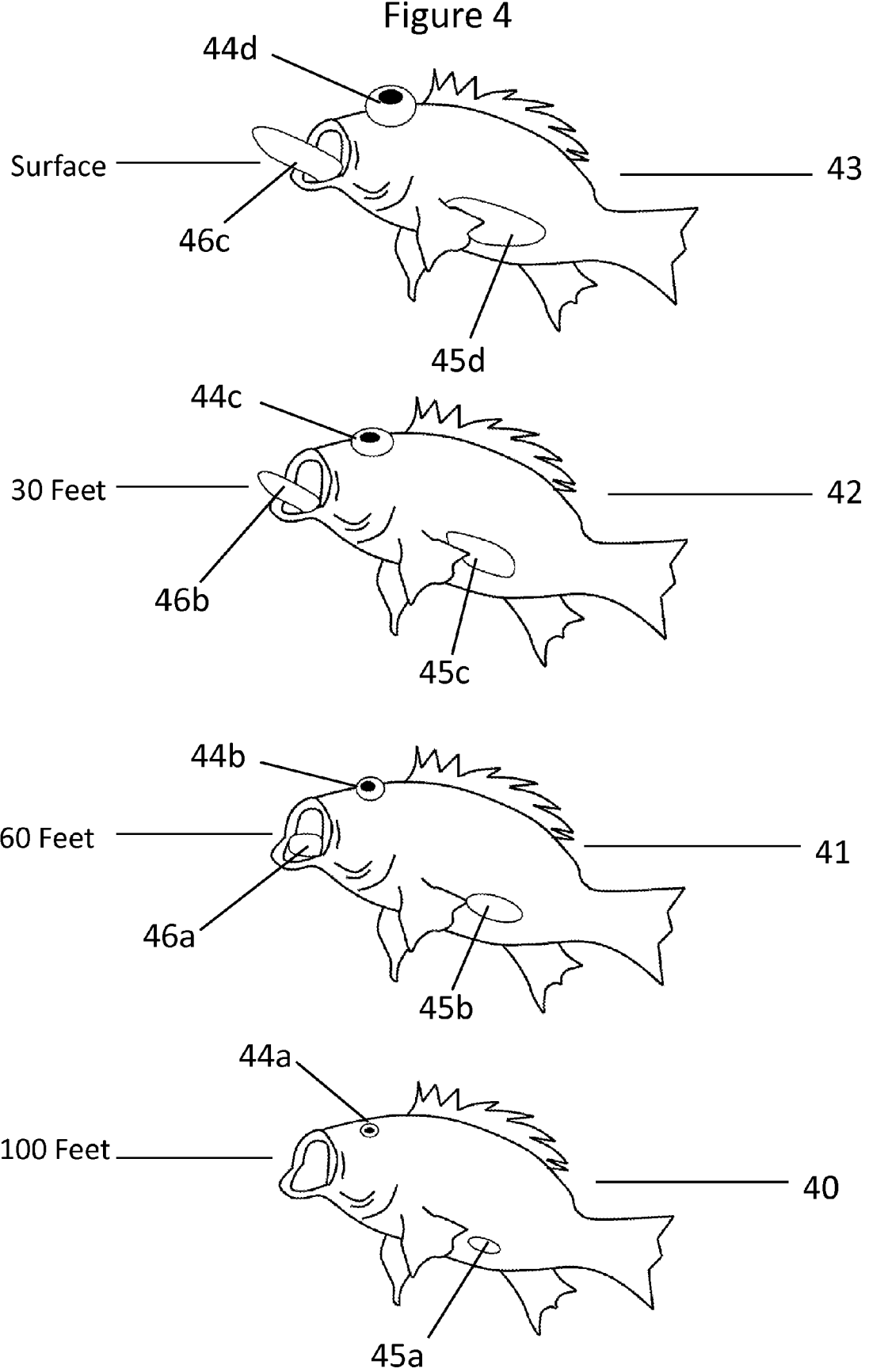
FIG. 4 shows the barotrauma process in a fish as it is caught and brought to the surface.

FIG. 4 shows the physical manifestations of barotrauma on a rockfish. Assuming that the rockfish is caught at 100' of water depth, (40), the fish has small eyes (44a) and a small swim bladder (45a). When the rockfish is reeled up to 60' of water depth, (41), the swim bladder (45b) starts to enlarge because of less atmospheric pressure. As the swim bladder expands it forces pressure against the stomach and pushes it towards the mouth (46a). The eyes (44b) begin to enlarge because of gas expansion. As the rockfish is hauled up to 30' of water (42), it loses one more atmosphere of pressure. This results in its swim bladder (45c) enlarging, which, in turn, results in bulging eyes (44c) and the expulsion of its stomach (46b) out of its mouth. Upon reaching the surface (43), the rockfish is now under 3 atmospheres of pressure less than it was under at 100' of water depth, with a resulting extreme enlargement of its swim bladder (45d), which, in turn, results in bulbous eyes (44d) that almost pop out of its body, and a stomach (46c) that extends prominently out of its mouth. A fish in condition (43) is one that has almost no hope of swimming back down to a depth sufficient to naturally decrease its swim bladder to the size where the fish can swim normally. This fish, unless something is done, is almost certain to become a "floater" and fall victim to a predator.

Figure 5:
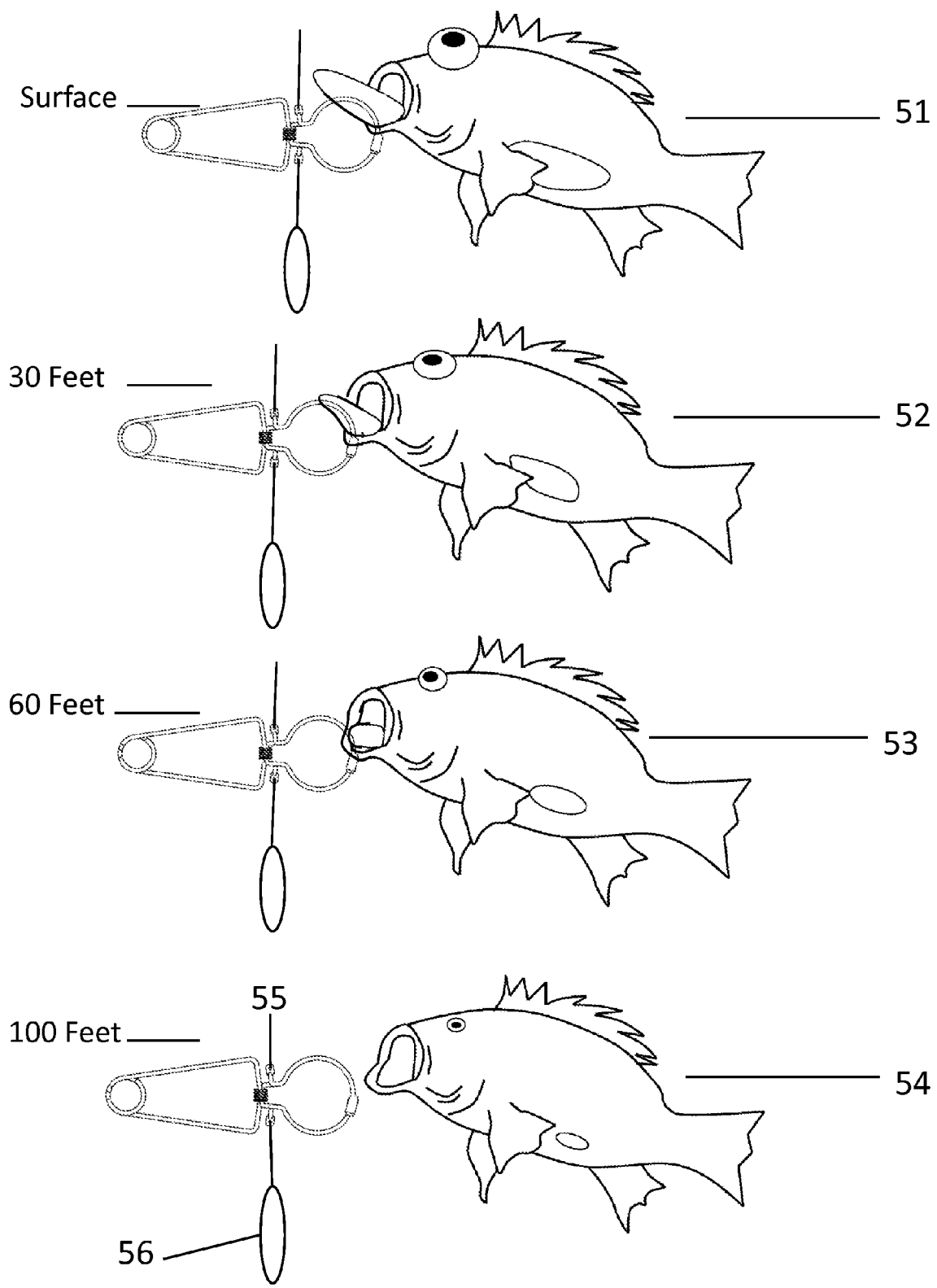
FIG. 5 is a side view showing how the invention works with a fish that has been become a victim of barotrauma and is now being lowered back to a safe depth.

FIG. 5 is a side view showing how the invention works. At the surface, (51), the invention is used to grasp the lower lip of the rockfish. A weight (56) attached to the bottom of the invention pulls the invention (and the attached rockfish) down toward deeper water. At around 30 feet of water depth (52), the rockfish's swim bladder has partially shrunk in size, so it becomes easier to pull the rockfish down. At around 60 feet of depth (53), the swim bladder retreats even more. At around 100 feet (54) the rockfish is in water deep enough so its swim bladder retreats to a normal size and its eyes go back to the eye sockets in the body. The stomach is now back to its normal position such that it no longer protrudes from the fish's mouth. At this depth, the fish can swim normally, so the angler pulls upward on the line (55). The weight (56) provides temporary resistance, and the spring compresses slightly, opening the jaws of the invention and allowing the fish to swim away. Should the fish remain within the jaws, the angler will feel the "throbbing" of the fish and can pull on the rod again, hoping to dislodge the fish on the second (or third) try.

Figure 6:
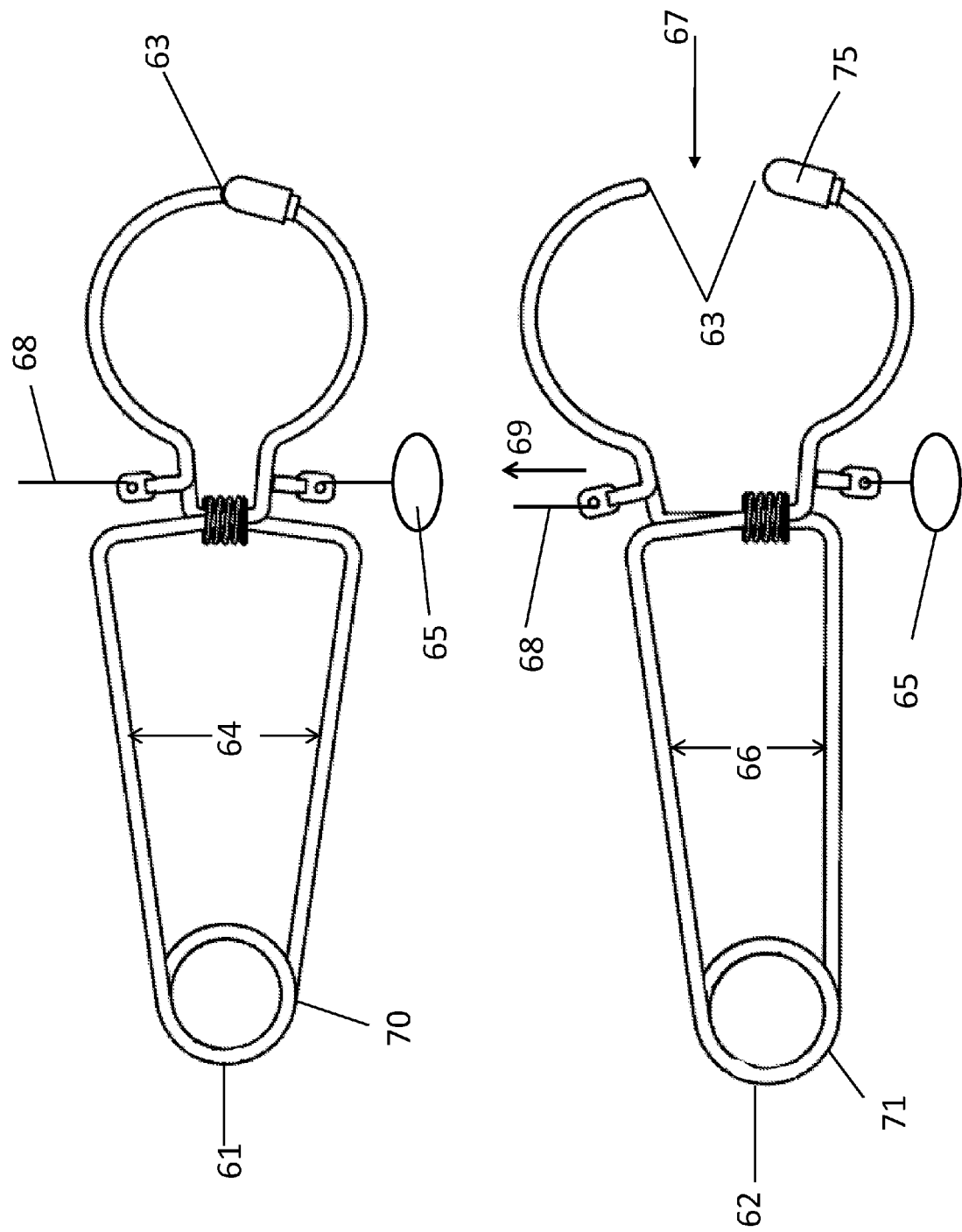
FIG. 6 is a side view showing the details of how the invention works.

FIG. 6 is a side view showing the details of how the invention works. In its relaxed state (61), the spring (70) creates pressure (64) sufficient to push the two opposing members apart, thereby forcing the jaws and points (63) together. By pushing in with the thumb and fingers, the angler can open the jaws, slip them over the lower lip of a rockfish, then release the pressure, allowing the pressure (64) from the spring (70) to close the jaws and points (63) over the rockfish lip and retain the rockfish. The angler then lowers the invention (and the attached rockfish) by a line (68) and a weight (65) pulls down the unit. A cap portion (75) covers an end of one of the opposing members to further protect the mouth of the fish from damage.

When the unit has reached water deep enough to reverse the barotrauma (62), he/she pulls up (69) sharply on the line (68). The weight (65) offers temporary resistance to the pull. The only thing that can absorb the pull during this instant is the spring (71), which pulls the opposing members toward each other (66) and pulls apart the jaws and points (63) thereby creating an opening (67) and allowing the rockfish to release and swim away.

Figure 7:
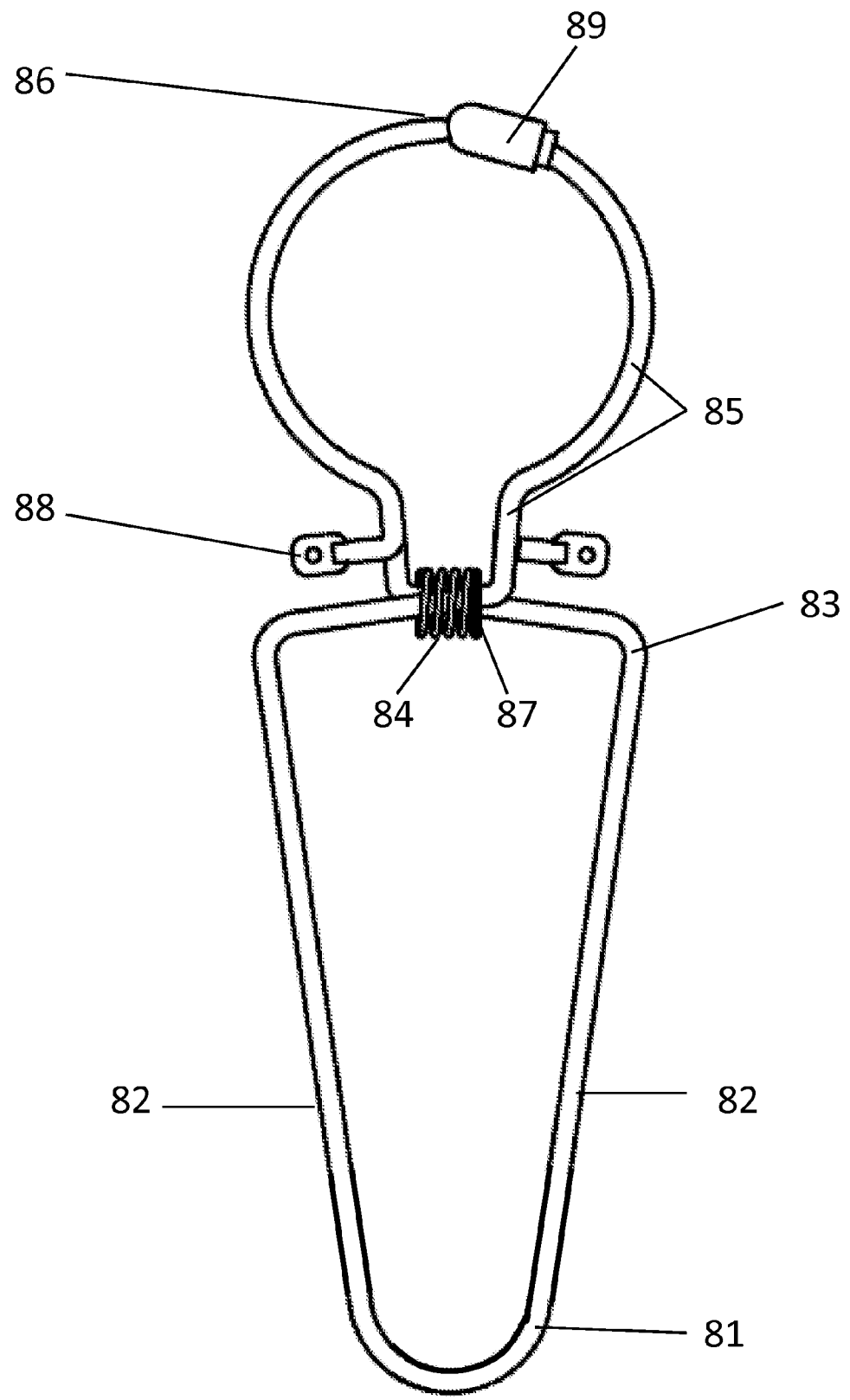
FIG. 7 is a top view of a fish descender and release device according to selected embodiments of the current disclosure.

FIG. 7 is a top view of a fish descender and release device according to selected embodiments of the current disclosure. Halfway in between the ends of the piece of wire, a spring (81) is created with a pre-set bend such that the two opposing members (82) coming out of either end of the spring are forcibly pressed in contact with each other. The opposing members have a sharp bend (83) and then cross over each other at point (84). A sleeve (87) encircles both opposing members. Each opposing member is then bent approximately 90 degrees upward, and then into a two-layered semicircular "jaws" (85), ending in contact points (86) before returning back and terminating in a flattened attachment point (88). The spring (81) creates pressure pushing the two opposing members (82) apart. The two opposing members (82) are kept in alignment by the sleeve (87), such that their contact points (86) remain in contact. There is, optionally, a plastic cap (89), also referred to as a cap portion, that covers the smaller, rounded end to further protect the mouth of the fish from damage. Thus, by using finger pressure on the two opposing members, an angler can open the jaws, slip the points over the lower lip of a barotrauma victim, then release the finger pressure, allowing the spring to force the points together to grasp and retain the rockfish.

That which is claimed:

1. A fish descender and release device comprising:
   a spring,
   two opposing members comprising a first opposing member and a second opposing member, where each opposing member has a jaw portion,
   means of attaching the first opposing member to a line,
   means of attaching the second opposing member to a weight,
   where each jaw portion has a terminal point portion, resulting in two contact points, where the point portion from the first opposing member mates with the point portion from the second opposing member,
   where the spring, the two opposing members and the means of attaching the first opposing member to a line, and the means of attaching the second opposing member to a weight are formed from one continuous piece of wire, and where the terminal point portion from the first opposing member consists of a tubular end section with an inner diameter greater than the diameter of the terminal point portion of the second opposing member, such that the terminal point of the second opposing member can fit inside the tubular end section of the terminal point portion of the first opposing member,
   where the means of attaching the first opposing member to a line and the means of attaching the second opposing member to a weight comprise two flattened, terminal ends of the wire.

2. The fish descender and release device of claim 1, where each of the two flattened, terminal ends has a hole.

3. The fish descender and release device of claim 2, additionally comprising a device to constrain movement of the two opposing members.

4. The fish descender and release device of claim 3, where the device to constrain movement of the two opposing members is a sleeve, where the sleeve comprises a hollow cylinder that encloses part of both of the two opposing members.

5. The fish descender and release device of claim 4, where the spring comprises one loop of wire.

6. The fish descender and release device of claim 4, where the jaw portion of each of the two opposing members comprises two layers of wire.

7. The fish descender and release device of claim 4, where at least one of the points additionally comprises a cap portion.

8. The fish descender and release device of claim 1, where the spring comprises a flexible opposing member with a preset bend such that the two opposing members are forcibly pressed in contact with one another.

9. A fish descender and release device consisting of:
   a spring,
   two opposing members comprising a first opposing member and a second opposing member, where each opposing member has a jaw portion,
   means of attaching one of the opposing members to a line,
   means of attaching the other of the opposing members to a weight,
   where each jaw portion has a terminal point portion, resulting in two contact points, where the point portion from one of the opposing members mates with the point portion from the other of the opposing members,
   where the two opposing members, the means of attaching one of the opposing members to a line, and the means of attaching the other of the opposing members to a weight are formed from one continuous piece of wire, and where the terminal point portion from the first opposing member consists of a tubular end section with an inner diameter greater than the diameter of the terminal point portion of the second opposing member, such that the terminal point of the second opposing member can fit inside the tubular end section of the terminal point portion of the first opposing member,
   where the means of attaching one of the opposing members to a line and the means of attaching the other of the opposing members to a weight comprise two flattened, terminal ends of the wire,
   where each of the two flattened, terminal ends has a hole,
   a means to constrain movement of the two opposing members, where the means to constrain movement of the two opposing members is a sleeve, where the sleeve comprises a hollow cylinder that encloses part of both of the two opposing members.

* * * * *